United States Patent
Morita et al.

(10) Patent No.: US 9,843,276 B2
(45) Date of Patent: Dec. 12, 2017

(54) DRIVE CONTROL CIRCUIT THAT DRIVES VIBRATOR, DRIVING METHOD, VIBRATION-TYPE DRIVING APPARATUS, AND IMAGE PICKUP APPARATUS

(71) Applicant: CANON KABUSHIKI KAISHA, Tokyo (JP)

(72) Inventors: Hiromitsu Morita, Sakado (JP); Jun Sumioka, Yokohama (JP); Shinji Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 15/010,396

(22) Filed: Jan. 29, 2016

(65) Prior Publication Data

US 2016/0226402 A1    Aug. 4, 2016

(30) Foreign Application Priority Data

Jan. 30, 2015  (JP) .................................. 2015-016791

(51) Int. Cl.
    *H04N 5/232* (2006.01)
    *H02N 2/00* (2006.01)
    *H02N 2/02* (2006.01)
    *H02N 2/10* (2006.01)

(52) U.S. Cl.
    CPC .......... *H02N 2/0075* (2013.01); *H02N 2/026* (2013.01); *H02N 2/103* (2013.01)

(58) Field of Classification Search
    CPC ....... H02N 2/0075; H02N 2/103; H02N 2/026
    See application file for complete search history.

(56) References Cited

U.S. PATENT DOCUMENTS

| | | | |
|---|---|---|---|
| 5,859,490 A | * | 1/1999 | Saya ...................... H02N 2/026 310/316.02 |
| 5,889,350 A | | 3/1999 | Yamamoto |
| 6,054,795 A | | 4/2000 | Yamamoto et al. |
| 6,084,334 A | | 7/2000 | Yamamoto et al. |
| 6,100,622 A | | 8/2000 | Yamamoto et al. |
| 6,608,426 B2 | | 8/2003 | Hayashi et al. |
| 6,724,607 B2 | | 4/2004 | Hayashi et al. |
| 7,365,474 B2 | | 4/2008 | Yamamoto et al. |

(Continued)

FOREIGN PATENT DOCUMENTS

JP    2009-089586 A    4/2009

*Primary Examiner* — Lin Ye
*Assistant Examiner* — John H Morehead, III
(74) *Attorney, Agent, or Firm* — Fitzpatrick, Cella, Harper & Scinto

(57) ABSTRACT

A drive control circuit restores a holding force when a vibrator and a driven body have been left at a standstill for a long time period and when they are used in a high-humidity environment. A drive circuit outputs an alternating-current signal, which is to be applied to an electro-mechanical energy conversion element, based on an output from a control unit. The control circuit controls the drive circuit with first timing such that elliptical motion produced in the vibrator takes a path of which a component parallel to a driving direction of the driven body is large as compared to such a path that a speed at which the driven body is driven is the maximum. The first timing is different from second timing with which relative positions of the vibrator and the driven body are changed.

19 Claims, 8 Drawing Sheets

(56) References Cited

U.S. PATENT DOCUMENTS

| | | | | |
|---|---|---|---|---|
| 7,755,251 B2* | 7/2010 | Kudo | ............... | H02N 2/062 310/316.01 |
| 2006/0290234 A1* | 12/2006 | Kasai | ............... | H02N 2/004 310/317 |
| 2008/0297923 A1* | 12/2008 | Koc | ............... | G02B 7/08 359/824 |
| 2010/0226637 A1* | 9/2010 | Kanda | ............... | G02B 7/08 396/133 |
| 2011/0141340 A1* | 6/2011 | Yumiki | ............... | G02B 7/08 348/345 |
| 2011/0156536 A1* | 6/2011 | Adachi | ............... | H01L 41/083 310/323.02 |
| 2011/0164331 A1* | 7/2011 | Sugiyama | ............... | H02N 2/062 359/823 |
| 2011/0298400 A1* | 12/2011 | Kudo | ............... | H02N 2/0015 318/116 |
| 2012/0140115 A1* | 6/2012 | Kudo | ............... | G02B 7/08 348/374 |
| 2012/0177354 A1* | 7/2012 | Ashizawa | ............... | G02B 27/1006 396/133 |
| 2014/0092493 A1* | 4/2014 | Topliss | ............... | G02B 7/08 359/824 |

* cited by examiner

MODE A

MODE B

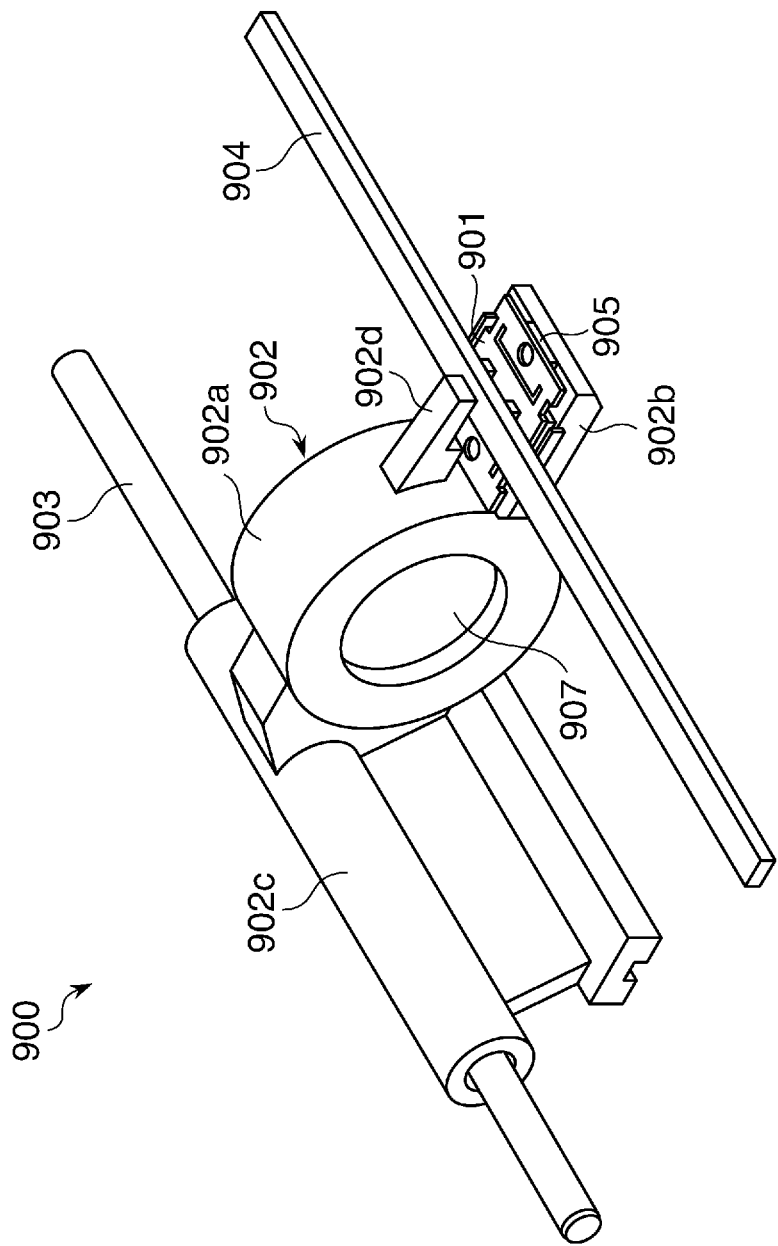

US 9,843,276 B2

DRIVE CONTROL CIRCUIT THAT DRIVES VIBRATOR, DRIVING METHOD, VIBRATION-TYPE DRIVING APPARATUS, AND IMAGE PICKUP APPARATUS

BACKGROUND OF THE INVENTION

Field of the Invention

The present invention relates to a vibration-type driving apparatus that brings a vibrator and a driven body into pressure contact with each other and moves the vibrator and the driven body relatively to each other by exciting vibrations in the vibrator, and in particular to a drive control circuit which drives the vibrator and a method to drive the vibrator.

Description of the Related Art

There is known a vibration-type actuator which brings a driven body into pressure contact with a vibrator, which is constructed by joining an electro-mechanical energy conversion element to an elastic body, and excites a predetermined vibration in the vibrator by applying an alternating-current signal to the electro-mechanical energy conversion element to thus move the vibrator and the driven body relatively to each other.

For example, there is known a vibrator in which a piezoelectric element, which is an electro-mechanical energy conversion element, is bonded to a first side of a plate-like elastic body, and two projecting portions are provided with a predetermined spacing therebetween on a second side opposite to the first side (see Japanese Laid-Open Patent Publication (Kokai) No. 2009-89586). In this vibrator, elliptical motion is produced in the projecting portions in a plane including a direction that connects the two projecting portions and a direction of a plate thickness of the elastic body by applying voltage to the piezoelectric element. By bringing the driven body into pressure contact with upper sides of the two projecting portions, the two projecting portions are caused to give driving force to the driven body in a driving direction that connects the two projecting portions together.

In this vibration-type actuator, while the vibrator is not being driven, the positional relationship between the vibrator and the driven body is held unchanged by frictional force, and hence there is no need to have an additional mechanism that keeps positions of the vibrator and the driven body. This enables downsizing, weight-saving, structure simplification, and so forth of various apparatuses having the vibration-type actuator.

In the vibration-type actuator described above, however, holding force generated between the vibrator and the driven body by pressure contact is influenced by moisture, humidity environment, and so forth between surfaces of contact, and when there is moisture between frictional sliding surfaces of the vibrator and the driven body, holding force decreases. For this reason, particularly when a long time period has elapsed after operation of the vibrator was stopped or when the vibrator and the driven body are used in a high-humidity environment, the vibrator and the driven body may become misaligned when the driving direction is switched or when the driven body is subjected to external force.

SUMMARY OF THE INVENTION

The present invention provides a drive control circuit, a driving method, a vibration-type driving apparatus, and an image pickup apparatus, which restore holding force when a vibrator and a driven body have been left at a standstill for a long time period and when they are used in a high-humidity environment.

Accordingly, the present invention provides a drive control circuit that drives one or a plurality of vibrators each having an electro-mechanical energy conversion element and a driving unit that comes into contact with a driven body, and moving the driven body and the driving unit relatively to each other through elliptical motion produced in the driving unit by application of an alternating-current signal to the electro-mechanical energy conversion element, comprising a control unit, and a drive circuit configured to output the alternating-current signal, which is to be applied to the electro-mechanical energy conversion element, based on an output from the control unit, wherein with first timing, the control unit controls the drive circuit such that the elliptical motion takes a path of which a component parallel to a driving direction of the driven body is large as compared to such a path that a speed at which the driven body is driven is the maximum, and the first timing is different from second timing with which relative positions of the driving unit and the driven body are changed.

According to the present invention, since elliptical motion produced between the vibrator and the driven body takes a path of which a component parallel to the driving direction of the driven body is large, frictional energy is generated to remove moisture existing on frictional sliding surfaces of the vibrator and the driven body. This restores holding torque even when the vibrator and the driven body have been left at a standstill for a long time period or when they are used in a high-humidity environment.

Further features of the present invention will become apparent from the following description of exemplary embodiments (with reference to the attached drawings).

BRIEF DESCRIPTION OF THE DRAWINGS

FIG. 9 is a perspective view schematically showing a construction of a lens drive mechanical unit having the vibration-type actuator according to the first embodiment of the present invention.

DESCRIPTION OF THE EMBODIMENTS

Hereafter, embodiments of the present invention will be described in detail with reference to the drawings. In the following description, it is assumed that "a vibration-type driving apparatus" includes "a vibration-type actuator" and "a drive control circuit for a vibrator", "a vibration-type actuator" includes "a vibrator" and "a driven body", and "a driven body" includes "an elastic body" and "an electro-mechanical energy conversion element".

Figure 1A:
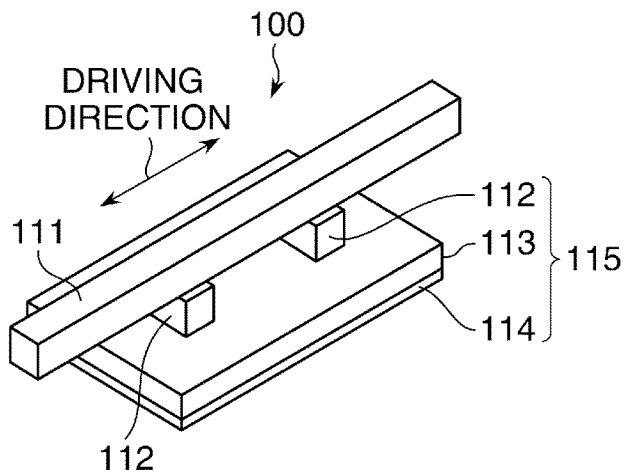
FIG. 1A is a perspective view schematically showing an arrangement of a vibration-type actuator according to a first embodiment, which constitutes a vibration-type driving apparatus according to the present invention.

FIG. 1A is a perspective view schematically showing an arrangement of a vibration-type actuator 100 according to a first embodiment, which constitutes a vibration-type driving apparatus according to the present invention.

The vibration-type actuator 100 has a driven body 111 and a vibrator 115. The vibrator 115 is comprised mainly of an elastic body 113, which is made of a flat metallic material, a piezoelectric element 114, which is an electro-mechanical energy conversion element and joined to one side (first side) of the elastic body 113, and two projecting portions 112 provided on the other side (second side opposite to the first side) of the elastic body 113. The driven body 111 and the two projecting portions 112 of the vibrator 115 are brought into pressure contact with each other by a pressurizing means, not shown.

Figure 1B:
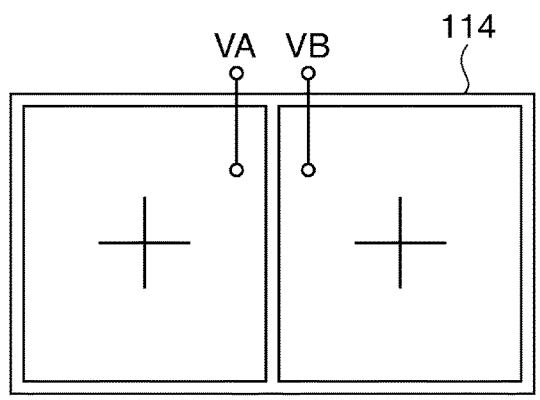
FIG. 1B is a plan view schematically showing an arrangement of a piezoelectric element which constitutes the vibration-type driving actuator.
Figure 1C:
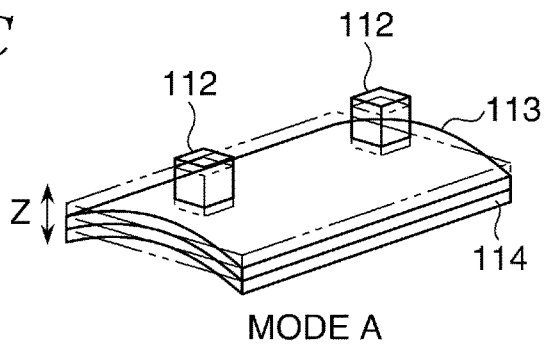
FIGS. 1C and 1D are views useful in explaining modes of vibration excited in a vibrator which constitutes the vibration-type driving actuator.
Figure 1D:
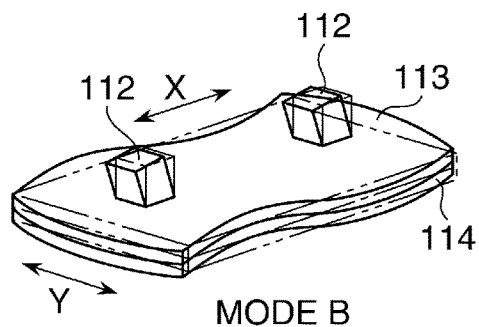

FIG. 1B is a plan view schematically showing an arrangement of the piezoelectric element 114. FIG. 1C is a view useful in explaining a first vibration mode (hereafter referred to as "the mode A") of vibration excited in the vibrator 115. FIG. 1D is a view useful in explaining a second vibration mode (hereafter referred to as "the mode B") of vibration excited in the vibrator 115. It should be noted that for the vibrator 115, a direction that connects the two projecting portions 112 together is defined as an X-direction, a direction of a thickness of the elastic body 113 is defined as a Z-direction, and a direction perpendicular to the X-direction and the Z-direction is defined as a Y-direction.

Two electrodes which are two equal parts in a long-side direction which is the X-direction are formed on one side of the piezoelectric element 114 as shown in FIG. 1B, and polarizing directions of the respective electrodes are the same (+). It should be noted that one common electrode (whole-surface electrode) is formed on the other side of the piezoelectric element 114. Of the two electrode regions of the piezoelectric element 114, an alternating-current voltage VB is applied to the electrode region on the right-hand side as viewed in the figure, and an alternating-current voltage VA is applied to the electrode region on the left-hand side as viewed in the figure. Assuming that the alternating-current voltages VB and VA have frequencies close to a resonance frequency in the mode A and are in the same phase, the entire piezoelectric element 114 (the two electrode regions) expands at a certain moment and contracts at another moment. As a result, vibration in the mode A shown in FIG. 1C is produced in the vibrator 115. Assuming that the alternating-current voltages VB and VA have frequencies close to a resonance frequency in the mode B and are out of phase by 180 degrees, the electrode region of the piezoelectric element 114 on the right-hand side as viewed in the figure contracts at a certain moment, and the electrode region of the piezoelectric element 114 on the left-hand side as viewed in the figure expands at the same time. At another moment, their relationship is reversed. As a result, vibration in the mode B shown in FIG. 1D is generated in the vibrator 115. The mode A is a primary out-of-plane bending vibration mode in which two nodes substantially parallel to the X-direction appear in the vibrator 115. The mode B is a secondary out-of-plane bending vibration mode in which three nodes substantially parallel to the Y-direction appear in the vibrator 115.

Figure 2A:
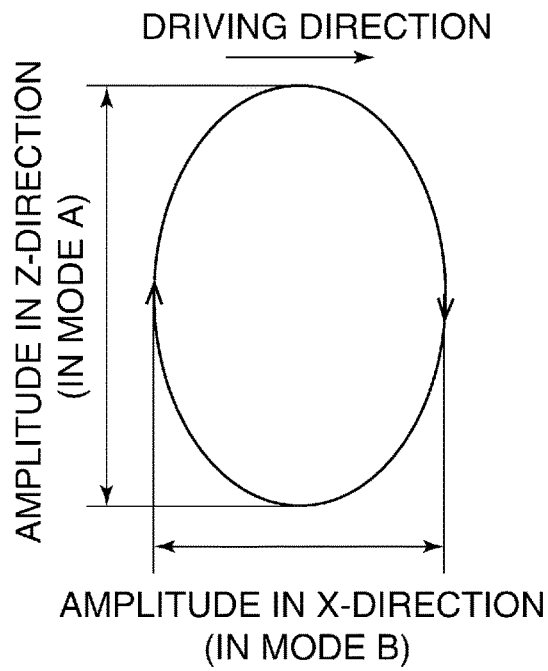
FIG. 2A is a view useful in explaining elliptical motion excited at ends of projecting portions constituting the vibrator in FIG. 2A.

FIG. 2A is a view useful in explaining elliptical vibration excited in ends of the projections 112. The projecting portions 112 are disposed close to an antinode of vibration in the mode A and close to nodes of vibration in the mode B. For this reason, the end of each projecting portion 112 swings like a pendulum on a node of vibration in the mode A to move back and forth in the X-direction and is also caused to move back and forth in the Z-direction by vibration in the mode B. Therefore, by exciting vibrations at the same time and superposing them such that a phase difference in vibration between the modes A and B can be close to ±π/2, elliptical motion in an X-Z plane is produced in end faces of the projecting portions 112. At this time, frictional force is exerted between the two projecting portions 112 and the driven body 111 due to pressure contact, and hence the elliptical motion of the projecting portions 112 generates driving force (thrust) which moves the vibrator 115 and the driven body 111 relatively to each other in the X-direction. Namely, the projecting portions 112 act as a driving unit for moving the vibrator 115 and the driven body 111 relatively to each other.

In the following description, the ratio between the amplitude in the Z-direction and the amplitude in the X-direction in elliptical motion produced in the ends of the projecting portions 112 is defined as an ellipse ratio of elliptical motion. Also, in the following description, it is assumed that in the vibration-type actuator 100, the vibrator 115 is fixed, and the driven body 111 is driven in the X-direction.

Figure 2B:
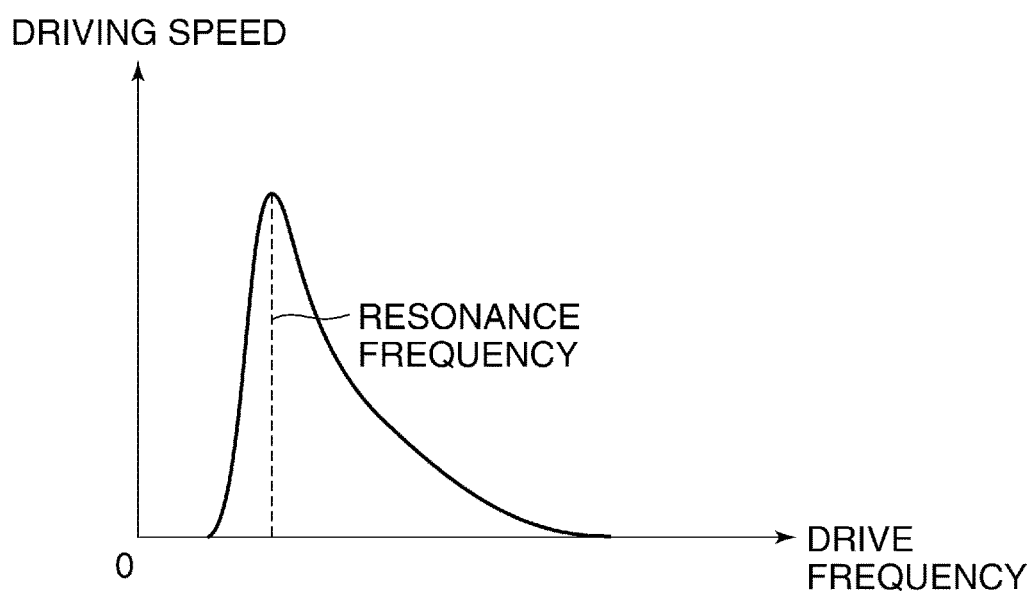
FIG. 2B is a view showing the relationship between driving frequency and drive speed of the vibration-type actuator.

FIG. 2B is a view showing the relationship between driving frequency and driving speed (speed at which the vibrator 115 and the driven body 111 move relatively to each other) of the vibration-type actuator 100. The driving speed reaches its peak when the vibration-type actuator 100 operates at a resonance frequency, gradually decreases at higher frequencies than the resonance frequency, and sharply decreases at lower frequencies than the resonance frequency. Thus, by changing the driving frequency of the piezoelectric element 114, the magnitude of oval vibration is changed while the ellipse ratio is maintained. For example, by making the driving frequency close to the resonance frequency of the vibration-type actuator 100, the magnitude of elliptical vibration is increased, and the driving speed is raised. On the other hand, by making the frequency of alternating voltage to be applied far from the resonance frequency of the vibration-type actuator 100, the magnitude of elliptical vibration is decreased, and the driving speed is lowered.

Figure 3A:
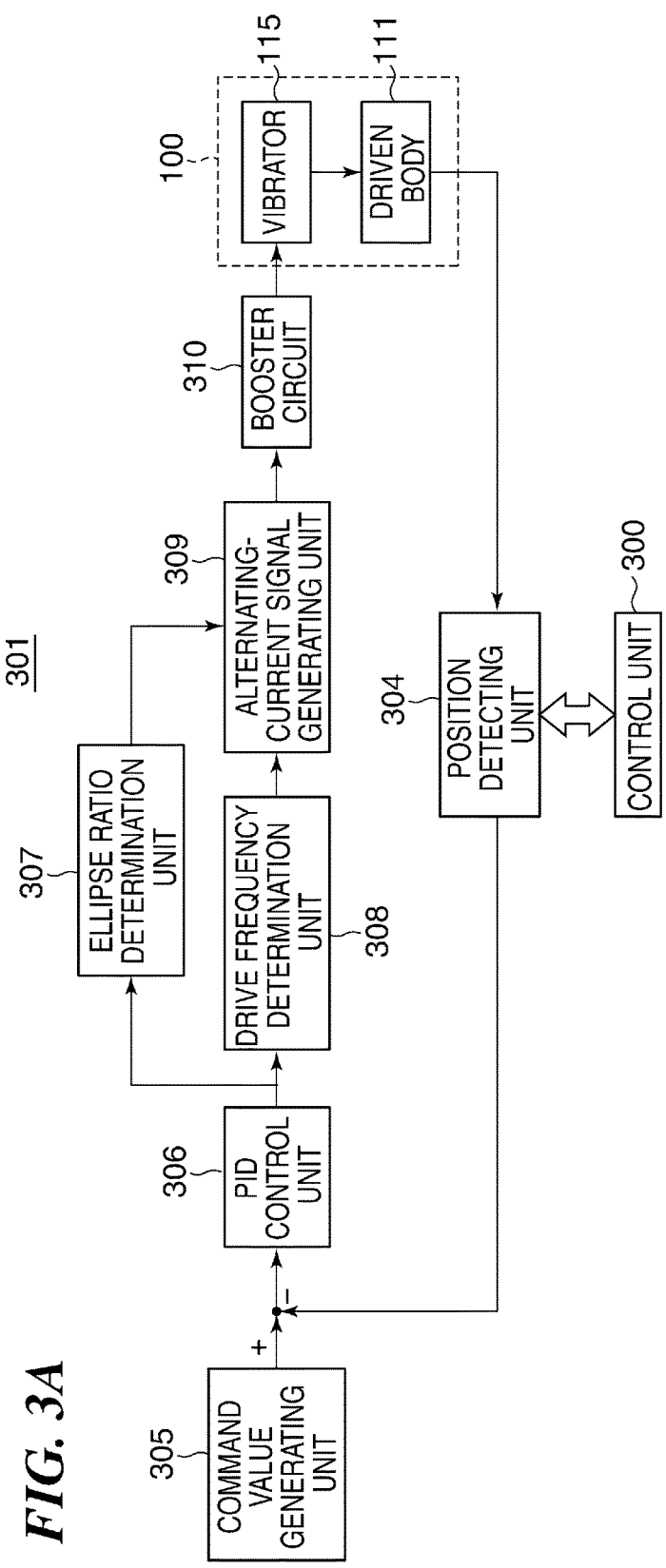
FIGS. 3A and 3B are block diagrams schematically showing an arrangement of a drive control circuit that drivingly controls the vibration-type actuator in FIG. 1A.

FIG. 3A is a block diagram schematically showing an arrangement of a drive control circuit that drivingly controls the vibration-type actuator 100. The drive control circuit for the vibrator 115 is comprised mainly of a control unit 300 and a drive circuit 301.

The vibration-type actuator 100 (the vibrator 115 and the driven body 111) in FIG. 3A has already been described with reference to FIGS. 1A to 1D, and hence description thereof is omitted here. The drive circuit 301 has a position detecting unit 304, a command value generating unit 305, a PID control unit 306, an ellipse ratio determination unit 307, a driving frequency determination unit 308, an alternating-current signal generating unit 309, and a booster circuit 310.

The units constituting the drive circuit 301 perform predetermined operations in accordance with outputs (control signals) from the control unit 300. It should be noted that the control unit 300, which is what is called a microcomputer, has an arithmetic device (CPU), a memory in which programs are stored, a memory which is a work area in which programs are expanded, and so forth, and controls the overall operation of the vibration-type driving apparatus by executing predetermined programs.

The position detecting unit 304, which is, for example, an encoder, detects a position of the driven body 111. The command value generating unit 305 generates a command value for moving the driven body 111. A signal relating to a deviation between a command value, which is output from the command value generating unit 305, and an output from the position detecting unit 304 is input to the PID control unit 306. It should be noted that a command value means a target position which varies with time and is set so as to provide positional control for moving the driven body 111 to a final stop position. The PID control unit 306 computes a manipulated variable for the vibrator 115.

The manipulated variable output from the PID control unit 306 is input to the ellipse ratio determination unit 307 and the driving frequency determination unit 308. Based on the manipulated variable obtained from the PID control unit 306, the ellipse ratio determination unit 307 determines an ellipse ratio of elliptical motion excited in the projecting portions 112 of the vibrator 115. Based on the manipulated variable obtained from the PID control unit 306, the driving frequency determination unit 308 determines a driving frequency to set a size of an ellipse in elliptical motion excited in the projecting portions 112 of the vibrator 115.

The ellipse ratio computed by the ellipse ratio determination unit 307 is a phase difference between the alternating-current voltages VA and VB applied to the piezoelectric element 114. An upper limit to the phase difference is set at, for example, 90 degrees, and when the driving direction is reversed, a lower limit to the phase difference is set at, for example, −90 degrees. Outputs from the ellipse ratio determination unit 307 and the driving frequency determination unit 308 are input to the alternating-current signal generating unit 309. The alternating-current signal generating unit 309 is, for example, a driver circuit that generates an alternating-current signal through switching.

In the present embodiment, when the phase difference determined by the ellipse ratio determination unit 307 is below the upper limit or above the lower limit, a driving frequency is set at an upper limit, and a two-phase alternating-current signal having this phase difference and this driving frequency is generated by the alternating-current signal generating unit 309. It should be noted that the driving frequency being set at the upper limit means that the driving frequency is set at the highest value or a value close to it among drive frequencies for use in driving the vibrator 115. On the other hand, when the phase difference determined by the ellipse ratio determination unit 307 is equal to the upper limit or the lower limit, the driving frequency determined by the driving frequency determination unit 308 is used, and a two-phase alternating-current signal having this phase difference and this driving frequency is generated by the alternating-current signal generating unit 309.

Figure 3B:
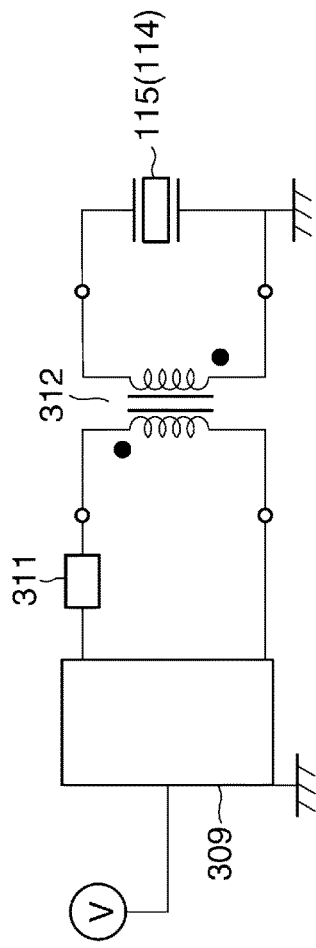

An output from the alternating-current signal generating unit 309 is input to the booster circuit 310. FIG. 3B is a circuit diagram schematically showing an arrangement of the booster circuit 310. The booster circuit 310, which has a coil 311 and a transformer 312, boosts a two-phase alternating-current signal generated by the alternating-current signal generating unit 309 through switching and applies the alternating-current signal to the electrodes of the piezoelectric element 114.

Figure 4A:
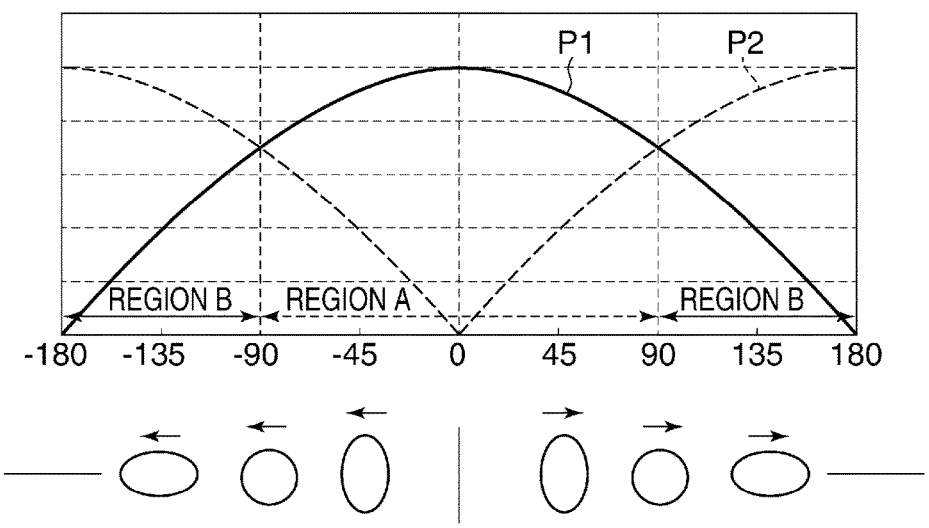
FIG. 4A is a view showing amplitudes of primary out-of-plane bending vibration and secondary out-of-plane bending vibration of the vibrator in FIG. 1A.
Figure 4B:
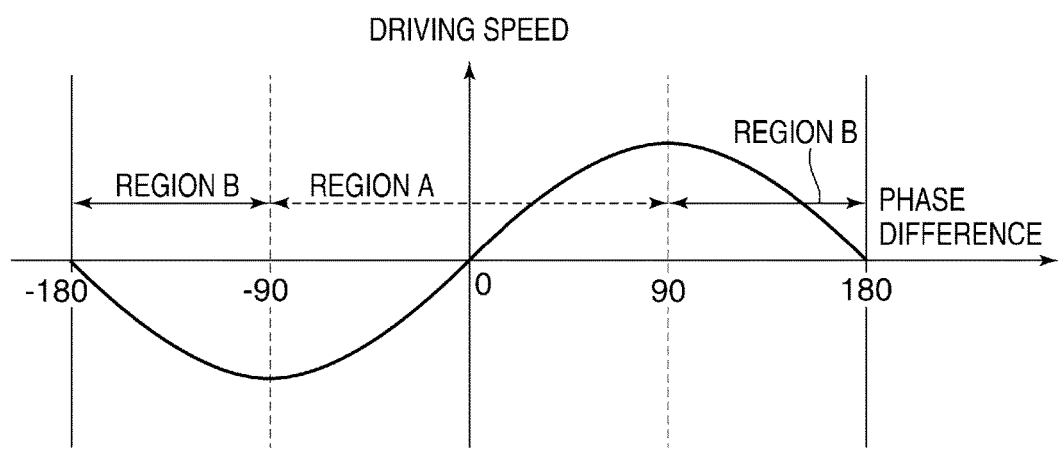
FIG. 4B is a view showing the relationship between phase difference and driving speed.
Figure 5:
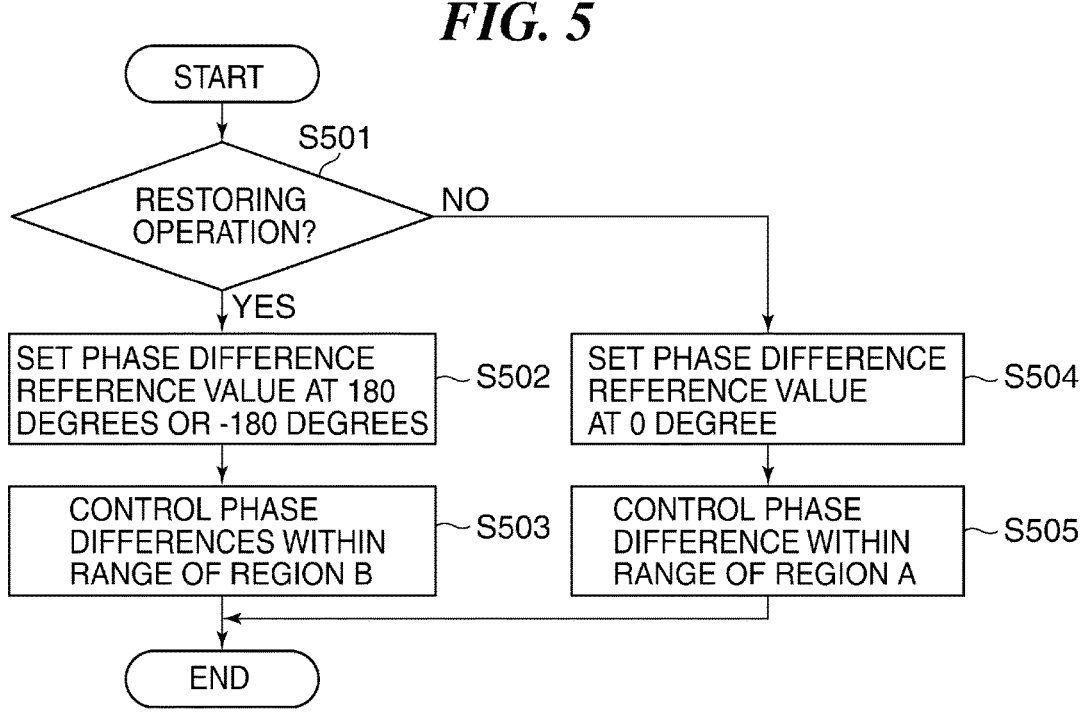
FIG. 5 is a flowchart of a method to drive the vibration-type actuator in FIG. 1A.

Referring next to FIGS. 4A to 6, a description will be given of a holding force restoring operation in the vibration-type actuator 100. FIGS. 4A and 4B are views showing the relationship among amplitude, phase difference, and drive speed in primary out-of-plane bending vibration and secondary out-of-plane bending vibration when a phase difference of an alternating-current signal is changed within a range from −180 degrees to 180 degrees. FIG. 5 is a flowchart of a method to drive the vibration-type actuator 100. Processes in the flowchart of FIG. 5 are implemented by the control unit 300 executing predetermined programs and controlling operation of the units of the drive circuit 301.

In step S501, the control unit 300 decides whether or not to perform the holding force restoring operation. When the control unit 300 decides to perform the holding force restoring operation (YES in the step S501), the process proceeds to step S502, and when the control unit 300 decides not to perform the holding force restoring operation (NO in the step S501), the process proceeds to step S504. It should be noted that the timing with which the holding force restoring operation is performed will be described later.

The control unit 300 performs the holding force restoring operation in the vibration-type actuator 100 using the drive circuit 301 similarly to when driving the vibrator 111 in the steps S502 and S503. The control unit 300 controls a phase difference within a range of a region B shown in FIG. 4B, that is, a range of a region B from 90 degrees to 180 degrees or −90 degrees to −180 degrees outside a region A in which the drive speed is the maximum. For example, in the step S502, the control unit 300 sets a phase difference reference value at 180 degrees. Then, in step S503, according to a deviation between a position at the start of the restoring operation and a current position, the control unit 300 determines a phase difference within the range of the region B, and on the spot (namely, without changing relative positions of the vibrator 115 and the driven body 111), vibrates the vibrator 115.

The holding force restoring operation in the vibration-type actuator 100 uses such vibration that elliptical motion in the ends of the projecting portions 112 takes a path of which a component parallel to the driving direction of the driven body 111 is large as compared to such a path that the driving speed is the maximum by mainly the secondary out-plane bending vibration. The effect of restoring holding force increases as the amplitude of vibration increases. Accordingly, by setting a phase difference at 180 degrees or in the vicinity thereof so that the amplitude of vibration in a direction perpendicular to surfaces of contact (frictional sliding surfaces) between the vibrator 115 and the driven body 111 can be the maximum, position servo control is provided by phase difference control, and thus the vibrator 115 and the driven body 111 are held on the spot. This generates frictional energy on contact surfaces (frictional sliding surfaces) of the vibrator 115 and the driven body 111, prevents decrease in holding force under the influence of moisture, and restores holding force that has decreased under the influence of moisture.

In the steps S504 and S505, the control unit 300 performs a normal driving operation to move the driven body 111 without performing the holding force restoring operation. At this time, the control unit 300 controls phase differences within a range of the region A shown in FIG. 4A, that is, a range of the region A from −90 degrees to 90 degrees inside a range in which the amplitude of primary out-of-plane bending vibration (P1) and secondary out-of-plane bending vibration (P2) is the greatest, and the moving speed is the maximum. Specifically, in the step S504, the control unit 300 sets a phase difference reference value at 0 degree, and in the step S505, according to a deviation between a target position and a current position, the control unit 300 determines a phase difference within the range of the region A and causes movement to the target position. At this time, the control unit 300 provides position servo control using drive frequencies if necessary.

Figure 6:
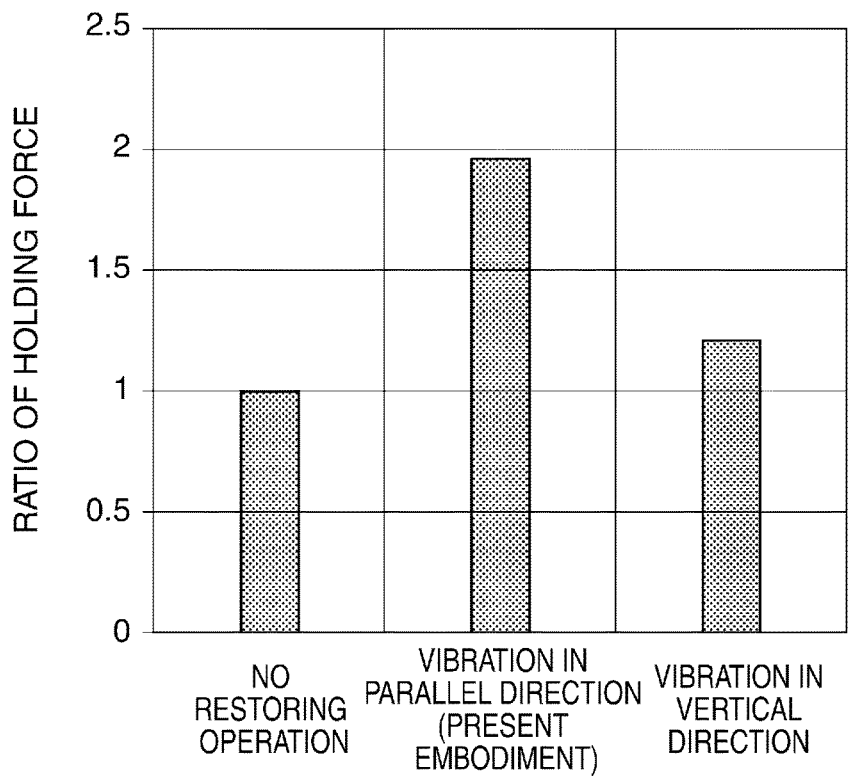
FIG. 6 is a view showing test results of a holding force restoring operation in the vibration-type actuator in FIG. 1A.
Figure 7A:
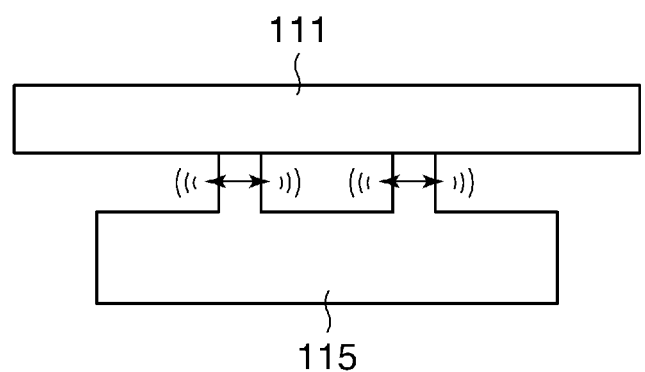
FIGS. 7A and 7B are diagrams schematically showing vibration produced in the vibrator in FIG. 1A.

FIG. 6 is a view showing test results of the holding force restoring operation in the vibration-type actuator 100. FIG. 7A is a diagram schematically showing vibration in a direction perpendicular to the contacting surfaces of the vibrator 115 and the driven body 111, and FIG. 7B is a diagram schematically showing vibration in a direction parallel to the contacting surfaces of the vibrator 115 and the driven body 111.

Figure 7B:
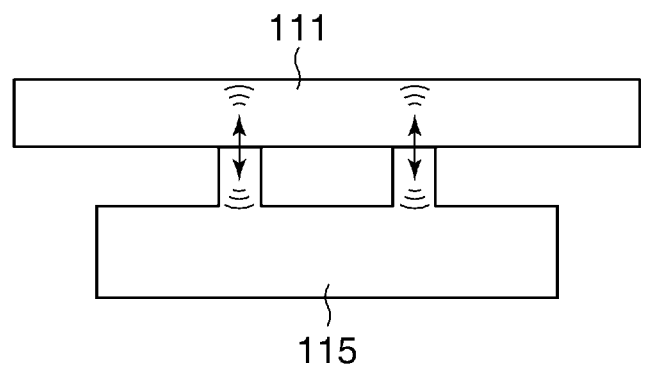

Referring to FIG. 6, assuming that holding force after leaving the vibration-type actuator 100 in a high-temperature environment is 1, holding force after vibration in the parallel direction in FIG. 7A is produced for 100 msec is 1.96, and holding force after vibration in the vertical direction in FIG. 7B is produced for the same time period is 1.21. This means that by performing the holding force restoring operation in the steps S502 and S503, holding force is restored to a greater degree than in the case where the holding force restoring operation is not performed or the case where vibration in FIG. 7B is produced.

A description will now be given of the timing with which the holding force restoring operation for the vibration-type actuator 100 is performed (first timing). When the vibration-type actuator 100 has been left for a long time period after operation of the vibration-type actuator 100 was stopped, and when the vibration-type actuator 100 is used in a high-humidity environment, holding force decreases due to the influence of moisture between the contacting surfaces of the vibrator 115 and the driven body 111. When the vibrator 115 or the driven body 111 is subjected to external force with holding force thus decreased, the vibrator 115 and the driven body 111 may become misaligned.

Thus, the holding force restoring operation is performed with different timing from the timing with which relative positions of the vibrator 115 and the driven body 111 are changed (second timing). Specifically, it is preferred that the holding force restoring operation is performed after power supply to the drive circuit 301 is turned on and before the vibrator 115 and the driven body 111 are moved relatively to each other by driving the vibrator 115. It is also preferred that the holding force restoring operation is performed immediately before power supply to the drive circuit 301 is turned off. Further, it is preferred that the holding force restoring operation is performed immediately after movement of the driven body 111 to a target position is completed. Additionally, it preferred that the holding force restoring operation is performed when a predetermined time period has elapsed with relative positions of the vibrator 115 and the driven body 111 kept unchanged. This inhibits the decrease of holding force and prevents the vibrator 115 and the driven body 111 from becoming misaligned due to external force.

It should be noted that when the holding force restoring operation is performed with any of the timings described above, an increase in power consumption may become a problem. Particularly when power supply to the drive circuit 301 is turned on or off, at a shift into sleep mode, and at a return from sleep mode, power consumption is likely to increase. Accordingly, a timer or the like may be used, and the holding force restoring operation may be performed only when a predetermined time period has elapsed.

As described above, according to the present embodiment, moisture between the contacting surfaces of the vibrator 115 and the driven body 111 is removed by generating frictional energy such that elliptical motion of the end faces of the projecting portions 112 takes a path of which a component parallel to the driving direction of the driven body 111 is large. This restores the force with which the vibrator 115 holds the driven body 111, and hence even when the vibration-type actuator 100 is subjected to external force, the vibrator 115 and the driven body 111 are prevented from becoming misaligned.

Figure 8:
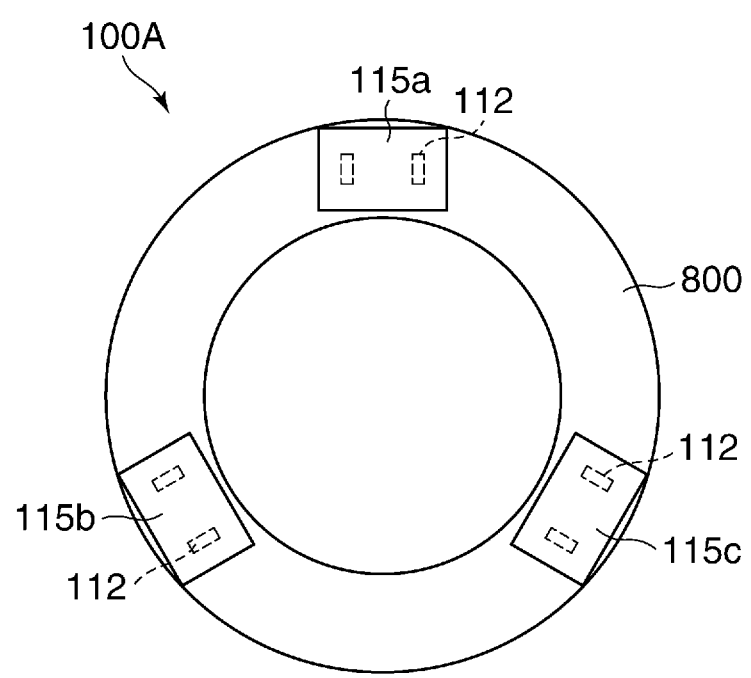
FIG. 8 is a plan view schematically showing a construction of a vibration-type actuator according to a second embodiment, which constitutes the vibration-type driving apparatus of the present invention.

FIG. 8 is a plan view schematically showing a construction of a vibration-type actuator 100A according to a second embodiment, which constitutes the vibration-type driving apparatus of the present invention. The vibration-type actuator 100A is comprised of an annular driven body 800, and three vibrators 115a, 115b, and 115c which are disposed at substantially regular intervals in a circumferential direction of the driven body 800.

It should be noted that the vibrators 115a to 115c are the same as the vibrator 115 of the first embodiment described above, and hence detailed description of their arrangements is omitted. Each of the vibrators 115a to 115c is placed on a base, not shown, so that a straight line which connects the centers of the two projecting portions 112 together is tangent to concentric circles of an inner periphery (or an outer periphery) of the driven body 800. As a result, by exciting vibrations in the modes A and B in the vibrators 115a to 115c at the same time, the driven body 800 is rotatively driven (or the vibrators 115a to 115c are rotated relatively to the driven body 800).

In the holding force restoring operation for the vibration-type actuator 100 according to the first embodiment described above, relative positions of the vibrator 115 and the driven body 111 are not changed by position servo control. On the other hand, in the vibration-type actuator 100A, a holding force restoring operation is allowed to be performed without using position servo control because it has a plurality of vibrators like the vibrators 115a to 115c.

Namely, while one of the vibrators 115a to 115c is at a standstill, vibration that takes a path of which a component parallel to a driving direction of the driven body 800 (vibration in FIG. 7A) is produced in the other two of the vibrators 115a to 115c. For example, first, the vibrator 115a is brought to a standstill, and a holding force restoring operation is performed using the vibrators 115b and 115c. Next, the vibrator 115b is brought to a standstill, and a holding force restoring operation is performed using the vibrators 115a and 115c. At last, the vibrator 115c is brought to a standstill, and a holding force restoring operation is performed using the vibrators 115a and 115b.

In each holding force restoring operation, a predetermined holding force is generated on contact surfaces of one vibrator at rest and the driven body 800, and hence when a holding force restoring operation is performed using the other vibrators, these vibrators restore holding force without changing their positions relative to the driven body 800. Also, at this time, the amplitude of vibration in the holding force restoring operation is allowed to be increased, and hence holding force is restored to a large degree within a short time period. As a result, in the vibration-type actuator 100A according to the second embodiment as well, the vibrators 115a to 115c and the driven body 800 are prevented from becoming misaligned even when the vibration-type actuator 100A is subjected to external force as with the vibration-type actuator 100 according to the first embodiment.

Referring to FIG. 9, a description will now be given of an arrangement of an image pickup apparatus (optical equipment) such as a camera, which is an exemplary apparatus having the vibration-type actuator 100 according to the first embodiment described above. FIG. 9 is a perspective view schematically showing a construction of a lens drive mechanical unit 900 of a lens barrel. The lens drive mechanical unit 900 has a lens holder 902 which is a driven body, a vibrator 901 which drives the lens holder 902, a pressure magnet 905, a first guide bar 903, a second guide bar 904, and a base, not shown.

The lens holder 902 has a cylindrical main body portion 902a, a holding portion 902b which holds the vibrator 901 and the pressure magnet 905, and a first guide portion 902c which is fitted on the first guide bar 903 to form a first guide portion, and a fall-off preventive portion 902d. The lens 907 is held in the main body portion 902a. The first guide bar 903 and the second guide bar 904 are placed parallel to each other, and both ends of each of the first guide bar 903 and the second guide bar 904 are fixed to the base, not shown.

The pressure magnet 905, which constitutes a pressurization means, is comprised of a permanent magnet and two yokes disposed at both ends of the permanent magnet. A magnetic circuit is formed between the pressure magnet 905 and the second guide bar 904, and suction force is generated between these members. As a result, ends of two projecting portions provided on the vibrator 901 are held in a state of being pressed against the second guide bar 904 by predetermined force to form a second guide portion.

It should be noted that the pressure magnet 905 is spaced from the second guide bar 904 and not in contact with the second guide bar 904. Thus, when, for example, the second guide portion is subjected to external force, the projecting portions of the vibrator 901 and the second guide bar 904 are drawn away from each other. In this case, however, the fall-off preventive portion 902d provided on the lens holder 902 comes into abutment with the second guide bar 904, bringing the holding portion 902b of the lens holder 902 back to its original position, so that the projecting portions of the vibrator 901 are brought back to the state of being in abutment with the second guide bar 904.

The vibrator 901 has the same construction as that of the vibrator 115 according to the first embodiment described above. Thus, applying a predetermined alternating-current voltage to a piezoelectric element of the vibrator 901 produces elliptical vibration in the two projecting portions and generates frictional driving force between the vibrator 901 and the second guide bar 904. At this time, since the first guide bar 903 and the second guide bar 904 are fixed, the generated frictional driving force enables the lens holder 902 to move in a longitudinal direction of the first guide bar 903 and the second guide bar 904.

It should be noted that although in the lens drive mechanical unit 900, magnetic force (the pressure magnet 905) is used as a pressure mechanism, this is not limitative, and urging force generated by a spring may be used. Moreover, although the lens drive mechanical unit 900 is configured here as a linear vibration-type driving apparatus, this is not limitative, and the rotary drive mechanical unit according to the second embodiment described above may be used to construct a lens drive mechanical unit. Namely, a ring-shaped member holding a lens is rotated using rotational force of a driven body, and at this time, an amount of rotation of the ring-shaped member is converted to a linear travel distance in a direction of an optical axis using such a method as engagement of a cam pin and a cam groove. This enables the lens to move in the direction of the optical axis.

It should be noted that although driving a lens using a vibration-type driving apparatus is suitable for driving of an auto focus lens, this is not limitative, driving using the same arrangement is possible for a zoom lens. A vibration-type driving apparatus may also be used to drive an image pickup device, on which light having passed through a lens forms an image, or to drive a lens or an image pickup device in compensating for camera shake.

It should be noted that a plurality of vibrators 115 may be placed for the rod-like driven body 111 to construct a vibration-type actuator, or two or four or more vibrators 115 may be placed for the driven body 800 to construct a vibration-type actuator.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-016791, filed Jan. 30, 2015 which is hereby incorporated by reference herein in its entirety.

What is claimed is:

1. A drive control circuit that drives at least one vibrator having an electro-mechanical energy conversion element and a projection portion that comes into contact with a driven body, and effects relative movement between the driven body and the projection portion through elliptical motion produced in the projection portion by application of an alternating-current signal to the electro-mechanical energy conversion element said drive control circuit, comprising:

a controller configured to control the at least one vibrator; and a drive circuit configured to output the alternating-current signal, which is to be applied to the electro-mechanical energy conversion element, based on an output from said controller, wherein in a case where a ratio of a component in a direction parallel to a driving direction of the driven body to a component in a direction of a thickness of the electro-mechanical energy conversion element in a path of the elliptical motion is defined as an ellipse ratio of the elliptical motion, said controller controls said drive circuit such that the ellipse ratio of the elliptical motion in a first driving mode is greater than an ellipse ratio of the elliptical motion in a second driving mode in which relative positions of the projection portion and the driven body are changed.

2. The drive control circuit according to claim 1, wherein in driving a plurality of vibrators, said controller controls said drive circuit in the first driving mode such that one of the plurality of vibrators is brought to a standstill, and the ellipse ratio of the elliptical motion produced in the projection portions of the rest of the vibrators is greater than the ellipse ratio of the elliptical motion in the second driving mode.

3. The drive control circuit according to claim 1, wherein the first driving mode is performed later than turning-on of power supply to the drive control circuit and earlier than execution of the second driving mode.

4. The drive control circuit according to claim 1, wherein the first driving mode is performed earlier than turning-off of power supply to the drive control circuit.

5. The drive control circuit according to claim 1, wherein the first driving mode is performed at a time at which a predetermined time period has elapsed with relative positions of the vibrator and the driven body unchanged.

6. The drive control circuit according to claim 1, further comprising a detector configured to detect a position of the driven body, wherein the first driving mode is performed later than said detector detects the driven body having moved to a target position.

7. A driving method for driving at least one vibrator having an electro-mechanical energy conversion element and a projection portion that comes into contact with a driven body, and effects relative movement between the driven body and the projection portion through elliptical motion produced in the projection portion by application of an alternating-current signal to the electro-mechanical energy conversion element, said driving method comprising:

a driving step of applying the alternating-current signal to the electro-mechanical energy conversion element and changing relative positions of the projection portion and the driven body; and a control step of, in a case where a ratio of a component in a direction parallel to a driving direction of the driven body to a component in a direction of a thickness of the electro-mechanical energy conversion element in a path of the elliptical motion is defined as an ellipse ratio of the elliptical motion, providing control such that the ellipse ratio of the elliptical motion is greater than an ellipse ratio of the elliptical motion provided in the driving step.

8. The driving method according to claim 7, wherein in driving a plurality of vibrators, one of the plurality of vibrators is brought to a standstill, and the elliptical motion produced in the projection portions of the rest of the vibrators is greater than the ellipse ratio of the elliptical motion in the control step.

9. A vibration-type driving apparatus comprising:

at least one vibrator configured to have an electro-mechanical energy conversion element and an elastic body with a first side to which said electro-mechanical energy conversion element is joined, and have a projecting portion provided on a second side opposite to the first side;

a driven body configured to come into pressure contact with said projecting portion; and a drive control circuit configured to drive said at least one vibrator, wherein elliptical motion is produced in said projecting portion to effect relative movement between said at least one vibrator and said driven body, and said drive control circuit comprises:

a controller configured to control said at least one vibrator; and a drive circuit that outputs an alternating-current signal, which is to be applied to said electro-mechanical energy conversion element so as to excite the elliptical motion in said projecting portion, based on an output from said controller, wherein in a case where a ratio of a component in a direction parallel to a driving direction of said driven body to a component in a direction of a thickness of said electro-mechanical energy conversion element in a path of the elliptical motion is defined as an ellipse ratio of the elliptical motion, said controller controls said drive circuit such that the ellipse ratio of the elliptical motion in a first driving mode is greater than an ellipse ratio of the elliptical motion in a second driving mode in which relative positions of said vibrator projection portion and said driven body are changed.

10. An image pickup apparatus comprising:

a vibration-type driving apparatus;

a lens configured to be driven by a driven body of said vibration-type driving apparatus; and an image pickup device configured to be provided at a location at which light having passed through said lens forms an image, wherein said vibration-type driving apparatus comprises:

at least one vibrator that comprises an electro-mechanical energy conversion element and an elastic body that has a first side to which said electro-mechanical energy conversion element is joined, and has a projecting portion on a second side opposite to the first side;

a driven body that comes into pressure contact with said projecting portion; and a drive control circuit that drives said at least one vibrator, wherein elliptical motion is produced in said projecting portion to effect relative movement between said at least one vibrator and said driven body, and said drive control circuit comprises:

a controller configured to control said at least one vibrator; and a drive circuit that outputs an alternating-current signal, which is to be applied to said electro-mechanical energy conversion element so as to excite the elliptical motion in said projecting portion, based on an output from said controller, wherein in a case where a ratio of a component in a direction parallel to a driving direction of said driven body to a component in a direction of a thickness of said electro-mechanical energy conversion element in a path of the elliptical motion is defined as an ellipse ratio of the elliptical motion, said control unit controls said drive circuit such that the ellipse ratio of the elliptical motion in a first driving mode is greater than an ellipse ratio of the elliptical motion in a second driving mode in which relative positions of said projecting portion and said driven body are changed.

11. The drive control circuit according to claim 1, wherein the alternating-current signal includes a first alternating-current voltage and a second alternating-voltage, and
wherein said controller controls the ellipse ratio of the elliptical motion by controlling a phase difference between the first alternating-current voltage and the second alternating-current voltage.

12. The drive control circuit according to claim 1, wherein in the first driving mode, said controller controls said drive circuit such that the projecting portion and the driven body do not move relatively.

13. The drive control circuit according to claim 1, wherein in the second driving mode, said controller controls said drive circuit such that the ellipse ratio of the elliptical motion falls within a range including a region from 0 to 1.

14. The drive control circuit according to claim 1, wherein in the first driving mode, said controller controls said drive circuit such that an ellipse ratio of the elliptical motion is large as compared to an ellipse ratio of the elliptical motion where a speed at which the projecting portion and the driven body move relatively to each other is the maximum in the second driving mode.

15. A drive control circuit that drives at least one vibrator having an electro-mechanical energy conversion element and a projecting portion that comes into contact with a driven body, and effects relative movement between the driven body and the projecting portion through elliptical motion produced in the projecting portion by application of a first alternating-current signal and a second alternating-current signal to the electro-mechanical energy conversion element, said drive control circuit comprising:
a controller configured to control the at least one vibrator,
wherein said controller controls a phase difference between the first alternating-current signal and the second alternating-current signal in a first driving mode in a range different from a range of a phase difference between the first alternating-current signal and the second alternating-current signal in a second driving mode in which the projecting portion and the driven body move relatively to each other, and
wherein an absolute value of the phase difference in the first driving mode is greater than that in the second driving mode.

16. The drive control circuit according to claim 15, wherein the range of the phase difference in the second driving mode includes a range not less than −90 degrees and not greater than 90 degrees.

17. The drive control circuit according to claim 15, wherein in driving a plurality of vibrators, said controller controls the plurality of vibrators in the first driving mode such that one of the plurality of vibrators is brought to standstill, and controls the phase difference applied to the rest of the vibrators in the range different from the range of the phase difference in the second driving mode.

18. The drive control circuit according to claim 15, wherein the first driving mode is performed at a time at which a predetermined time period has elapsed with relative positions of the vibrator and the driven body unchanged.

19. The drive control circuit according to claim 15, wherein in the first driving mode, said controller controls the at least one vibrator such that the projecting portion and the driven body do not move relatively to each other.

\* \* \* \* \*